3,246,949
PRODUCTION OF BORON TRIFLUORIDE

Franciszek Olstowski, Freeport, Tex., assignor to The Dow Chemical Company, Midland, Mich., a corporation of Delaware
No Drawing. Filed May 28, 1965, Ser. No. 459,917
5 Claims. (Cl. 23—205)

This application is a continuation-in-part of application Serial No. 192,955, filed May 7, 1962.

This invention relates to the production of boron trifluoride. More particularly, this invention relates to the production of boron trifluoride from alkali metal fluoborates.

Diborane is a useful intermediate in the production of high energy fuels. Usually, diborane is produced either by the reaction of boron trifluoride with an alkali metal hydride in an appropriate solvent, as, for example:

$$6NaH + 8BF_3 \xrightarrow{solvent} B_2H_6 + 3NaBF_4$$

or, by the reaction of boron trifluoride with an alkali metal borohydride in an appropriate solvent, as, for example:

$$3NaBH_4 + 4BF_3 \xrightarrow{solvent} B_2H_6 + 3NaBF_4$$

It is usually desirable and economically necessary to recover boron trifluoride from the alkali metal fluoborate formed in the production of diborane. Recovered boron trifluoride may then be utilized in the production of additional diborane.

One known method for the recovery of boron trifluoride from alkali metal fluoborates is by simple thermal decomposition. Thermal decomposition of alkali metal fluoborates usually occurs at very high temperatures (500–900 degrees centigrade), as, for example:

$$NaBF_4 \rightarrow NaF + BF_3$$

This process may be enhanced by use of vacuum equipment to help increase decomposition rates. In general, this method is undesirable because of the high temperatures required, the slow rates of decomposition (at about 540 degrees centigrade and one atmosphere of pressure, about twenty percent of the starting potassium fluoborate decomposes in four hours), and the fact that the presence of alkali metal fluoride tends to stabilize the remaining fluoborate.

Another method for the recovery of boron trifluoride from alkali metal fluoborates is by reaction with boron oxide and sulphuric acid, as for example:

$$6NaBF_4 + B_2O_3 + 6H_2SO_4 \rightarrow 6NaHSO_4 + 8BF_3 + 3H_2O$$

Water tends to hydrolyze boron trifluoride so that product water in the above reaction must be removed. This is generally accomplished by use of excess amounts of sulphuric acid. A major disadvantage of this process is the necessity of excessive amounts of sulphuric acid used for water removal.

A still further method of producing boron trifluoride from alkali metal fluoborates is by combined electrochemical and thermal dissociation as outlined in U.S. Patent 2,772,228.

It is an object of the present invention to provide a simple, one-step process, operable at modest temperatures, for the recovery of boron trifluoride from alkali metal fluoborates.

The objects and advantages of the present invention may be realized by reacting an alkali metal fluoborate with an anhydrous inorganic chloride, and removing boron trifluoride from the reaction zone. As a general proposition, the reaction of the present invention follows the equation:

$$FeCl_3 + 3KBF_4 \rightarrow 3KCl + FeF_3 + 3BF_3$$

Anhydrous inorganic chlorides appropriate for use in the process of the present invention are those which hydrolyze in water to form acidic solutions such as, for example, $BCl_3$, $SiCl_4$, $TiCl_4$, $SnCl_4$, $FeCl_3$, $PCl_3$, $SbCl_5$, $CrCl_3$, $AlCl_3$, and the like. Hereinafter, inorganic chlorides appropriate for use in the present invention, because of their common characteristic of hydrolyzing in water to form acidic solutions, will be referred to as "acidic chlorides."

Appropriate alkali metal fluoborates from which boron trifluoride may be recovered by the process of the present invention are: $KBF_4$, $NaBF_4$, $LiBF_4$, $RbBF_4$, and $CsBF_4$.

Reaction may be carried out at temperatures from about 100 to about 400 degrees centigrade and preferably at form about 100 to about 250° C. Specific reaction temperatures will depend on the specific chloride and fluoborate reacted.

Atmospheric pressures are generally to be preferred for the process of the present invention. Sub-atmospheric or super-atmospheric pressures may be used without deleterious effect, but with no particular advantage. Atmospheric pressure is usually preferred mainly because of simplicity in desgin and operation of reaction vessels.

For best results, at least one atom equivalent of chlorine in the acidic chloride per mole of fluoborate is required. Less chloride may be used with a corresponding lowering of the percentage conversion of fluoborate. Good results are obtained with as many as three atom equivalents of chlorine per mole of fluoborate, but more than about three atom equivalents of chlorine per mole of fluoborate should be avoided as wasteful and uneconomical.

Suitable reaction vessels are those constructed of materials which will withstand the effects of heating and the effects of the reactants and products of the present process. The vessels should also be equipped with means for heating the reactants and means to collect the gaseous products of the reaction.

The process of the present invention is begun by positioning within a suitable reaction vessel the desired amounts of an appropriate anhydrous inorganic chloride and the alkali metal fluoborate to be treated. The temperature of the reaction mixture is raised to the desired reaction temperature. As reaction takes place, gaseous boron trifluoride is evolved. If desired, the temperature may be raised to maintain a good rate of gas evolution. Usually, the boron trifluoride product of the present process is removed from the reaction vessel as it is evolved, but this is not required.

The process of the present invention may be better understood in light of the following examples, which are set forth to illustrate, but are not to be construed to limit, this invention.

*Example 1.*—A nickel reactor ten inches long and having a one inch diameter was charged with a mixture of sixteen grams of anhydrous $FeCl_3$ and nineteen grams of $KBF_4$. Maintaining the pressure within the reactor at about one atmosphere, the reactor and the reaction mixture therein were heated slowly to about 180 degrees centigrade. At this temperature, a rapid gas evolution took place. Infrared analysis indicated that the product gas was substantially all $BF_3$. The temperature was slowly raised, over a period of about an hour, to about 250 degrees centigrade. Reaction was discontinued at this time. Analysis of the residue indicated the evolution of 8.3 grams of $BF_3$, corresponding to a conversion of about 81 percent of the $KBF_4$ charged. Reaction time was about one hour.

For comparison, ordinary thermal methods converted about one percent of KBF$_4$ charged in one hour at 400 degrees centigrade.

*Example 2.*—To the reactor of Example 1 was charged nineteen grams of KBF$_4$ and ten grams of PCl$_5$. The reactor and its contents were heated to a temperature of about 130 degrees centigrade, at which temperature rapid gas evolution occurred. Over a period of about 100 minutes the temperature of the reactor and contents was slowly raised to about 200 degrees centigrade, at the end of which time reaction was discontinued. Infared analysis of the product gas indicated the presence, in substantial quantities, of BF$_3$ and PF$_5$. Trace amounts of POF$_3$ were detected in the early gas product. This was supposed to be due to small amounts of water present in the reactants.

*Example 3.*—To a Pyrex test tube was charged a mixture of 33 grams of NaBF$_4$ and 13.3 grams of AlCl$_3$. The tube and its contents were heated to about 130 degrees centigrade, at which temperature rapid gas evolution occurred. Infrared analysis indicated that the product gas was substantially all BF$_3$.

*Example 4.*—Using substantially the same procedures outlined in Examples 1 through 3, BCl$_3$, SiCl$_4$, TiCl$_4$, SnCl$_4$, SbCl$_5$, or CrCl$_3$ may be substituted for the anhydous inorganic chlorides therein used, and LiBF$_4$, RbBF$_4$, or CsBF$_4$ may be substituted for the alkali metal fluoborates therein used. When such substiutions are made, the resulting production of boron trifluoride is substantially the same as in Examples 1 through 3.

Various modifications may be made in the present invention without departing from the spirit or scope thereof, and it is to be understood that I limit myself only as defined in the appended claims.

I claim:

1. A method of producing boron trifluoride comprising, reacting an alkali metal fluoborate with an anhydrous acidic chloride selected from the group consisting of BCl$_3$, SiCl$_4$, TiCl$_4$, SnCl$_4$, FeCl$_3$, PCl$_3$, SbCl$_5$, CrCl$_3$ and AlCl$_3$, at a temperature of from about 100 to about 400 degrees centigrade, and removing boron trifluoride as a product of the reaction.

2. A method of producing boron trifluoride comprising, reacting an alkali metal fluoborate with an anhydrous acidic chloride selected from the group consisting of BCl$_3$, SiCl$_4$, TiCl$_4$, SnCl$_4$, FeCl$_3$, PCl$_3$, SbCl$_5$, CrCl$_3$ and AlCl$_3$, at a temperature of from about 100 to about 400 degrees centigrade, in amounts such that there is present at least one gram atom of chlorine in the acidic chloride per gram mole of fluoborate, and removing boron trifluoride as a product of the reaction.

3. A method of producing boron trifluoride comprising, reacting about nineteen parts by weight of potassium fluoborate with about sixteen parts by weight of anhydrous ferric chloride at temperatures ranging from about 180 to about 250 degrees centigrade, and removing boron trifluoride as a product of the reaction.

4. A method of producing boron trifluoride comprising reacting about nineteen parts by weight of potassium fluoborate with about ten parts by weight of anhydrous phosphorus pentachloride at temperatures ranging from about 130 to about 200 degrees centigrade, and removing boron trifluoride as a product of the reaction.

5. A method of producing boron trifluoride comprising, reacting about 33 parts by weight of sodium fluoborate with 13.3 parts by weight of anhydrous aluminum chloride at a temperature of about 130 degrees centigrade, and removing boron trifluoride as a product of the reaction.

References Cited by the Examiner

UNITED STATES PATENTS

| | | | |
|---|---|---|---|
| 2,135,458 | 11/1938 | Schultz | 23—205 X |
| 2,628,991 | 2/1953 | Schneider et al. | 23—205 |
| 2,787,527 | 4/1957 | Kilpatrick | 23—205 X |
| 2,889,370 | 6/1959 | Schechter. | |

OTHER REFERENCES

Vinnik et al., "Chem. Abs.," vol. 51; Zhur. Neorg. Khim. 1, pp. 628–631 (1956).

BENJAMIN HENKIN, *Primary Examiner.*